US009852770B2

(12) United States Patent
Anderson

(10) Patent No.: US 9,852,770 B2
(45) Date of Patent: Dec. 26, 2017

(54) TECHNOLOGIES FOR DYNAMIC GENERATION OF A MEDIA COMPILATION

(71) Applicant: Intel Corporation, Santa Clara, CA (US)

(72) Inventor: Glen J. Anderson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/866,887

(22) Filed: Sep. 26, 2015

(65) Prior Publication Data
US 2017/0092328 A1    Mar. 30, 2017

(51) Int. Cl.
| | | |
|---|---|---|
| *G10H 1/36* | (2006.01) | |
| *G11B 27/036* | (2006.01) | |
| *G06F 17/30* | (2006.01) | |
| *G11B 27/10* | (2006.01) | |
| *H04N 5/93* | (2006.01) | |
| *H04N 9/82* | (2006.01) | |

(52) U.S. Cl.
CPC ...... *G11B 27/036* (2013.01); *G06F 17/30056* (2013.01); *G06F 17/3082* (2013.01); *G06F 17/30752* (2013.01); *G11B 27/10* (2013.01); *H04N 5/93* (2013.01); *H04N 9/8205* (2013.01)

(58) Field of Classification Search
CPC ......... G06F 17/30746; G06F 17/30781; G06F 17/30778; G06F 17/30784; G06F 17/30843; G06F 17/30855; G06F 17/30858; G06F 17/30997; H04N 21/4307; H04N 2201/3247; G11B 20/10527; G11B 2020/00072; G06K 2209/27; G10H 2240/131; G10H 2240/125
See application file for complete search history.

(56) References Cited

U.S. PATENT DOCUMENTS

| | | | | |
|---|---|---|---|---|
| 8,996,538 B1 * | 3/2015 | Cremer | ............. | G06F 17/30864 707/749 |
| 2010/0293190 A1 * | 11/2010 | Kaiser | ..................... | G06F 3/048 707/769 |
| 2015/0234833 A1 * | 8/2015 | Cremer | ............... | G06F 17/3053 707/626 |
| 2016/0239508 A1 * | 8/2016 | Pearson | ............ | G06F 17/30778 |

\* cited by examiner

*Primary Examiner* — Marlon Fletcher
(74) *Attorney, Agent, or Firm* — Barnes & Thornburg LLP

(57) ABSTRACT

Technologies for generating a media compilation include comparing video metadata associated with a video to audio metadata associated with a plurality of digital songs to determine one or more matches between the compared metadata. The metadata defines various characteristics of the corresponding video and digital songs, and each match is indicative of a similar characteristic of the video and a corresponding digital song. One or more sync points are generated based on the determined matches and one or more songs are selected based on the sync points. The sync points may be prioritized based on the characteristics associated with the sync point and/or the degree of similarity. The video and the selected digital song(s) are subsequently compiled based on the associated sync points.

19 Claims, 8 Drawing Sheets

| MATCHING METADATA | CORRELATION WEIGHT |
|---|---|
| LYRIC MATCHES IMAGE | 8 |
| AMPLITUDE MATCHES VIDEO MOTION | 4 |
| SONG MEANING MATCHES VIDEO CONTENT | 7 |
| LYRIC MATCHES SPOKEN IN VIDEO | 3-10 |
| TEMPO MATCHES AUDIO OF VIDEO | 3 |
| LYRIC MATCHES COLOR IN VIDEO | 4 |
| SONG GENRE MATCHES VIDEO CONTENT | 5 |
| SONG PREFERRED BY USER | 6 |
| SONG RELATED TO LOCATION OF VIDEO | 6 |
| SONG MENTIONS OBJECT IN VIDEO | 8 |

| VIDEO METADATA | AUDIO METADATA | CORRELATION WEIGHT |
|---|---|---|
| BIRTHDAY CAKE IMAGE | "BIRTHDAY" LYRIC | 8 |
| FAST MOTION | HIGH AMPLITUDE | 4 |
| COLOR IN VIDEO | COLOR MENTIONED IN LYRIC | 4 |
| IMAGE OF LONDON | LYRIC INCLUDES "LONDON" | 6 |
| MONEY IMAGE | SONG MEANING RELATES TO MONEY | 7 |
| SHOWS PERSON SKIING | FAST TEMPO | 7 |
| PERSON SKIING FALLS IN VIDEO | "WIPE OUT" LYRIC | 10 |

FIG. 8

TECHNOLOGIES FOR DYNAMIC GENERATION OF A MEDIA COMPILATION

BACKGROUND

Media compilations include video and associated audio. In professionally produced media compilations, the audio of the media compilation is often synced with the video (e.g., similar tempo or speed). Oftentimes, such professionally produced media compilations require a professional to manually sync the audio and video by manually adjusting or modifying either or both media such that two media match each other. Such manual syncing can be time intensive and difficult.

With the ever increasing power of personal and desktop computers, typical users are creating media content at an ever increasing rate. For example, many users like to create media compilations from personal or home video by attaching one or more songs to the home video. However, because the typical user is not a professional, the creation of the media compilation can be overly complicated. For example, the typical user may not know how to sync a song to the home video and/or select suitable songs for the particular video.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 6 is a simplified diagram of at least one embodiment of a correlation policy that may be used by the compute device of FIGS. 1 and 2 to select audio for the media compilation;

FIG. 7 is a simplified diagram of at least one embodiment of correlation policy that may utilized by the compute device of FIGS. 1 and 2 during the execution of the method of FIGS. 5 and 6; and FIG. 8 is a simplified diagram of at least one embodiment of sync table that may be generated by the compute device of FIGS. 1 and 2 during the execution of the method of FIGS. 5 and 6.

DETAILED DESCRIPTION OF THE DRAWINGS

Figure 1:
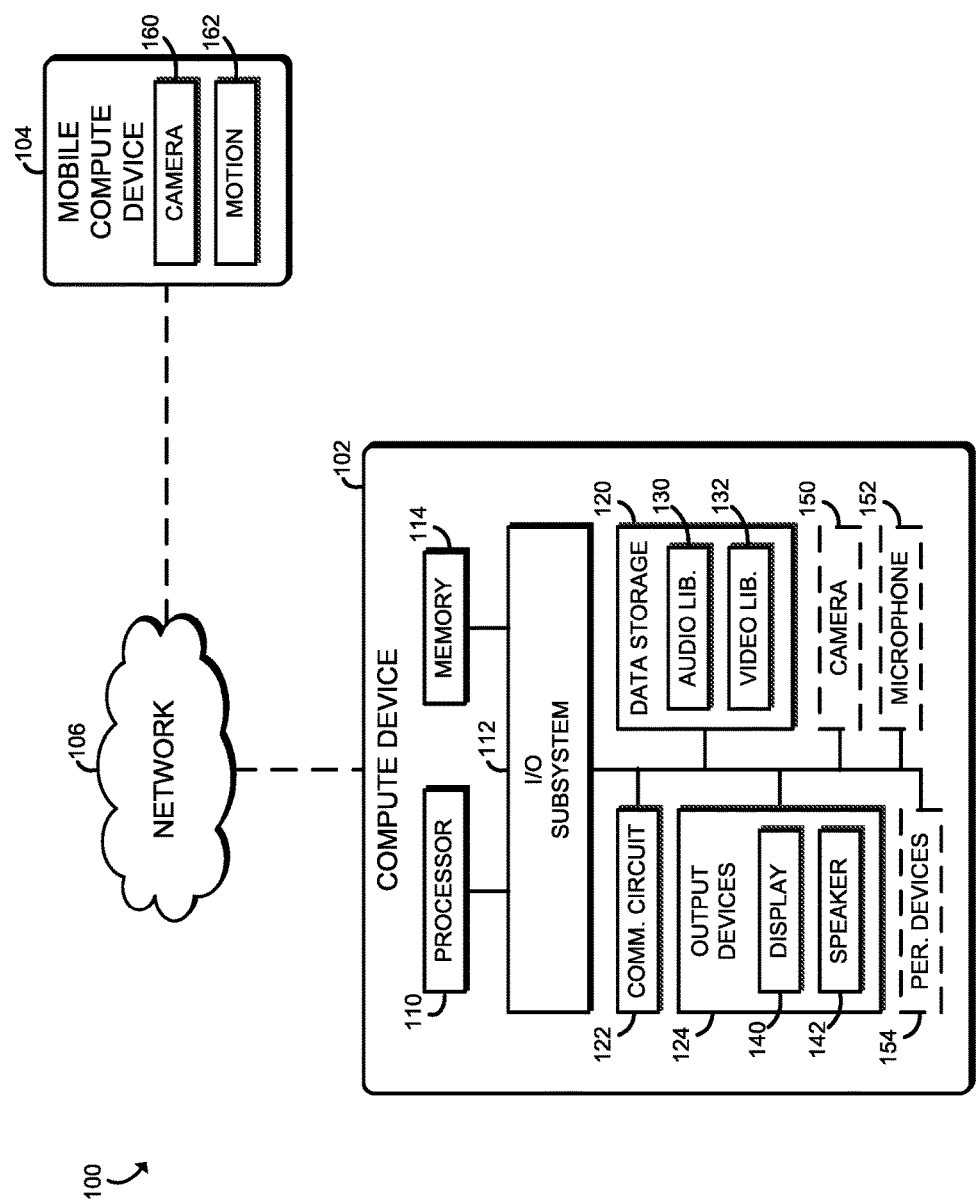
FIG. 1 is a simplified block diagram of at least one embodiment of a compute device for generating a media compilation.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 for generating a media compilation includes a compute device 102, which may be configured to communicate with one or more mobile compute devices 104 over a network 106. In use, the compute device 102 is configured to generate a media compilation of a selected video and audio available to the compute device 102. Illustratively, the audio includes, or is embodied as, one or more digital songs, but may include other audio data in other embodiments. To generate the media compilation of the selected video and audio, the compute device 102 compares video metadata associated with the video and audio metadata associated with each digital song to determine whether any of the metadata matches. If a match is found between the two metadata, the compute device 102 generates a sync point for the particular match. As discussed in more detail below, the metadata may be embodied as one or more metadata tags, each of which is indicative of a different characteristic of the associated video or digital song. As such, each sync point is indicative of a matching characteristic between the video and the corresponding digital song. In some embodiments, the compute device 102 is configured to prioritize the generated sync points. For example, the compute device 102 may apply a weighting factor to each sync point based on a correlation policy, which may define a weighting factor for various matching characteristics. The compute device 102 may subsequently select one or more digital songs to be compiled with the video based on the sync points (e.g., based on the weighting factor associated with each sync point). The compute device 102 compiles the video and the selected song(s) to generate a media compilation. In so doing, the compute device 102 may sync the selected song(s) to the video based on one or more of the generated sync points between the video and selected song(s). Additionally, in some embodiments, the compute device 102 may modify or adjust the selected song(s) to fit or better sync with the video. In this way, the compute device 102 is configured to generate a media compilation of media owned by the user with little or no direction from the user.

The compute device 102 may be embodied as any type of computer or compute device capable of performing the functions described herein. For example, the compute device 102 may be embodied as a desktop computer, a tablet computer, a smartphone, a laptop computer, a notebook, a netbook, an Ultrabook™, a smart device, a personal digital assistant, a mobile Internet device, and/or other compute device. As shown in FIG. 1, the illustrative compute device 102 includes a processor 110, an input/output ("I/O") subsystem 112, a memory 114, a data storage 120, a communication circuit 122, and one or more output devices 124. Of course, the compute device 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the compute device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the compute device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the compute device 102, on a single integrated circuit chip.

The data storage 120 may be embodied as any type of device or devices configured for short-term or long-term storage of data such as, for example, memory devices and circuits, memory cards, hard disk drives, solid-state drives, or other data storage devices. Illustratively, the data storage 120 includes an audio library 130 and a video library 132 stored therein. The audio library 130 may store audio useable by the compute device 102 to generate the media compilation. Illustratively, the audio stored in the audio library is embodied as one or more digital songs, but may include other audio data (e.g., sound effects, sound bites, background noise, recorded audio, etc.). Similar to the audio library 130, the video library 132 stores one or more videos usable by the compute device 102 to generate the media compilation. The videos stored in the video library 132 may be embodied as any type of video to which a digital song or other audio may be synced including, but not limited to, a home video or other video captured by a user of the compute device 102. The videos may or may not include associated sound (e.g., the videos may be embodied as multi-media videos or A/V media).

The communication circuit 122 may be embodied as any type of communication circuit, device, or collection thereof, capable of enabling communications between the compute device 102 and other remote devices, such as the mobile compute device 104, over the network 106. The communication circuit 126 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The output devices 124 may include as any type of output device useable by the compute device 102 to present the compiled media to a user of the compute device 102. In the illustrative embodiment, the output devices 124 include a display 140 and a speaker 142, but may include additional or other components in other embodiments. The display 140 may be embodied as any type of display capable of display the compiled media to the user. For example, the display 140 may be embodied as a liquid crystal display (LCD), a light emitting diode (LED) display, a cathode ray tube (CRT) display, a plasma display, and/or other display device. Additionally, in some embodiments, the display 140 may be embodied as a touchscreen display. The speaker 142 may be embodied as any type of audio generation device, such as a speaker or annunciator, capable of playing audio of the compiled media to the user.

In some embodiments, the compute device 102 may also include one or more input devices to generate a video and/or audio, which may be subsequently used by the compute device 102 to generate the media compilation. For example, the compute device 102 may include a camera 150 configured to generate video data and/or a microphone 152 configured to generate audio data. Additionally, the compute device 102 may include other peripheral devices 154 in some embodiments.

In some embodiments, the compute device 102 may receive the video to be used to generate the media completion from the mobile compute device 104. The mobile compute device 104 may be embodied as any type of mobile computing device capable of generating a video. For example, the mobile compute device 104 may be embodied as a worn or user-carried compute device such as a pair of smart glasses, smart clothing, smart phone, a head or body-worn camera, or the like. As such, the mobile compute device 104 may include components, such as a processor and memory, typically found in a compute device. Additionally, the compute device 102 may include a camera 160 configured to generate a video of the user or of a surrounding environment of the user (e.g., a video of an activity performed by the user such skinning or skydiving). In some embodiments, the compute device 102 may also include one or more context sensors to generate context data indicative of a context of the video captured by the camera 160. For example, in the illustrative embodiment, the mobile compute device 104 includes a motion sensor 162 to capture motion data contemporaneously with the capturing of the video by the camera 160. Such motion data may be used by the compute device 102 while analyzing the video to generate the metadata of the video as discussed in more detail below. Of course, the mobile compute device 104 may include other types of context sensors and the context data associated with any captured video may include other types of context data in other embodiments.

As discussed above, the mobile compute device 104 may transmit any captured video, and associated context data, to the compute device 102 over the network 106. The network 106 may be embodied as any type of communication network capable of facilitating communication between the mobile compute device 104 and the compute device 102. As such, the network 106 may include one or more networks, routers, switches, computers, and/or other intervening devices. For example, the network 106 may be embodied as or otherwise include one or more local or wide area networks, cellular networks, publicly available global networks (e.g., the Internet), an ad hoc network, a short-range communication network or link, or any combination thereof.

Figure 2:
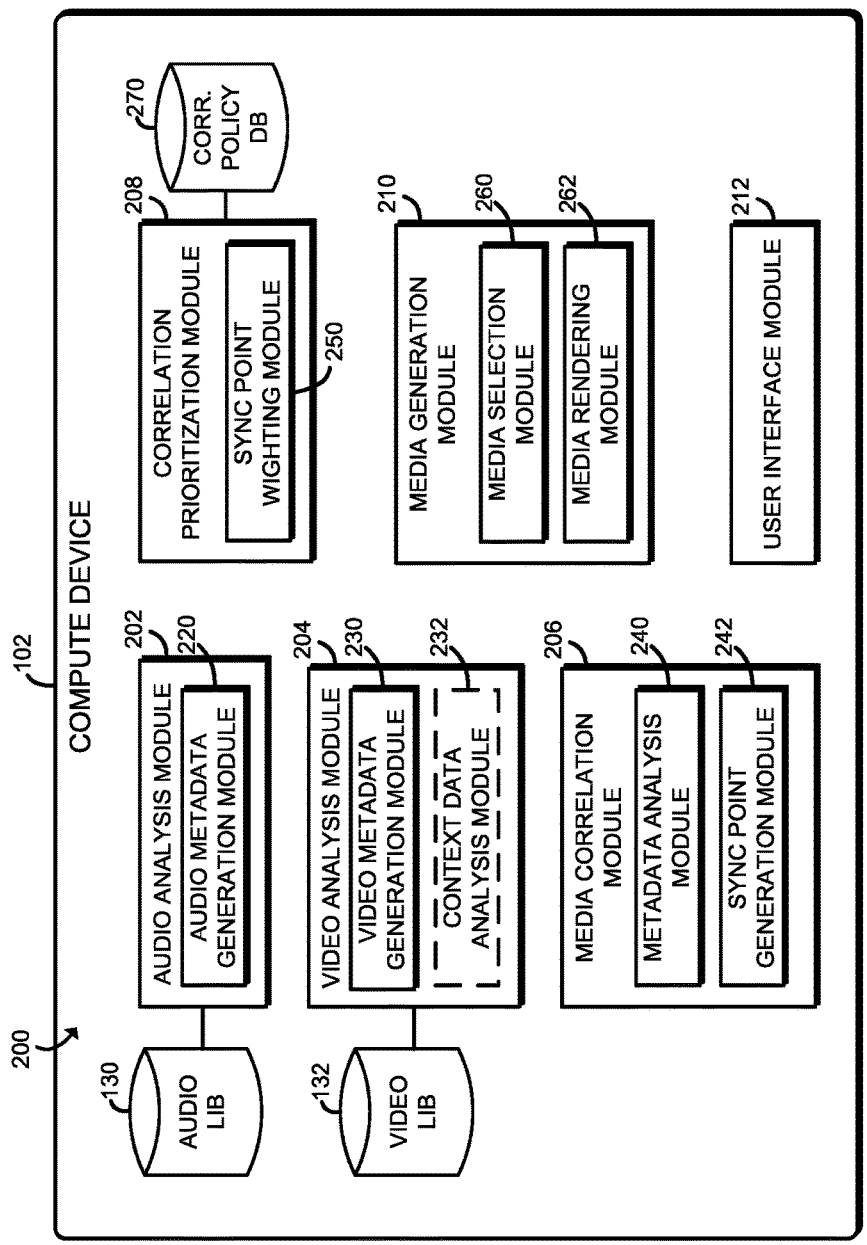
FIG. 2 is a simplified block diagram of at least one embodiment of an environment that may be established by the compute device of FIG. 1.

Referring now to FIG. 2, in use, the compute device 102 establishes an environment 200 for generating a media compilation. The illustrative environment 200 includes an audio analysis module 202, a video analysis module 204, a media correlation module 206, a correlation prioritization module 208, a media generation module 210, and a user interface module 212. The various modules of the environment 200 may be embodied as hardware, software, firmware, or a combination thereof. For example, the various modules, logic, and other components of the environment 200 may form a portion of, or otherwise be established by, the processor 110 or other hardware components of the compute device 102. As such, in some embodiments, one or more of the modules of the environment 200 may be embodied as circuitry or collection of electrical devices (e.g., an audio analysis circuitry 202, a video analysis circuitry 204, a media correlation circuitry 206, a correlation prioritization circuitry 208, a media generation circuitry 210, and a user interface circuitry 212). It should be appreciated that, in such embodiments, one or more of the audio analysis circuitry 202, the video analysis circuitry 204, the media correlation circuitry 206, the correlation prioritization circuitry 208, the media generation circuitry 210, and/or the user interface circuitry 212 may form a portion of one or more of the processor 110, the I/O subsystem 112, the memory 114, the data storage 120, the communication circuitry 122, and/or the output devices 124. Additionally, in some embodiments, one or more of the illustrative modules may form a portion of another module and/or one or more of the illustrative modules may be independent of one another.

The audio analysis module 202 is configured to analyze one or more digital songs or other audio data stored in the audio library 130 and generate, via an audio metadata generation module 220, audio metadata indicative of one or more characteristics of each digital song. To do so, the audio analysis module 202 may analyze any aspect of the digital song including the audio content (e.g., the lyrics, tempo, melody, breaks, instruments, etc.). Additionally, in some embodiments, the audio analysis module 202 may analyze other data associated with the digital song, which may be attached to the digital song or available from a remote source. The other associated data may include, for example, metadata about the digital song such as the song genre, the song performer, the date of publication of the song, the meaning of the song, and/or other data that may not be obtainable based on a direct analysis of the content of the song.

As discussed above, the metadata generated by the audio metadata generation module 220 is illustratively embodied as one or more metadata tags. Each metadata tag may be indicative of a characteristic of the associated digital song. For example, one metadata tag may identify a lyric of the digital song (e.g., "happy birthday"), another metadata tag may identify the tempo of the digital song (e.g., "fast tempo), and yet another metadata tag may identify an object mentioned in the digital song (e.g., "birthday cake"). In some embodiments, the audio metadata generation module 220 is also configured to determine metadata location data that identifies a location within the digital song at which each metadata tag is located. For example, a metadata tag identifying an object mentioned in the digital song may include metadata location data that identifies the point in time of the digital song at which the object is mentioned. Of course, some metadata tags may not include metadata location data because such location data is inapplicable or applies to the entire digital song (e.g., a metadata tag identifying a performer of the digital song).

Similar to the audio analysis module 202, the video analysis module 204 is configured to analyze one or more videos stored in the video library 132 and generate, via a video metadata generation module 230, video metadata indicative of one or more characteristics of the corresponding video. To do so, the video analysis module 204 may analyze any aspect of the video including the video content (e.g., images of the video, objects shown in the video, actions performed in the video, colors shown in the video, motion of the video, etc.). Additionally, in some embodiments, the video analysis module 204 may include a video context analysis module 232 configured to analyze a context of the video to generate the metadata. For example, in some embodiments, the video context analysis module 232 may be configured to infer various context characteristics about the video based an analysis of the video (e.g., the video is about skiing, the video is a birthday video, etc.). Additionally, the video context analysis module 232 may analyze existing metadata attached to or associated with the video. For example, the video may include existing data associated therewith that identifies the location or time at which the video was captured. Additionally, as discussed above, the video may include context data indicative of a context of the video (e.g., as captured by the mobile compute device 104). In such embodiments, the video context analysis module 232 may analyze the context data of the video, which may be indicative of a motion of a person captured in the video and/or the videographer.

The metadata generated by the video metadata generation module 230 is illustratively embodied as one or more metadata tags. Each metadata tag may be indicative of a characteristic of the video. For example, one metadata tag may identify an image shown in the video (e.g., a birthday cake) or an action performed by a person captured in the video (e.g., person skiing). Similar to the audio metadata generation module 220, the video metadata generation module 230 may also be configured to determine metadata location data that identifies a location within the video at which each metadata tag is located. For example, a metadata tag identifying an object shown in the video may include metadata location data that identifies the point in time in the video at which the object is mentioned. Of course, some metadata tags may not include metadata location data because such location data is inapplicable or applies to the entire digital song (e.g., the location at which the video was captured).

The media correlation module 206 is configured to analyze the video metadata associated with the video and the audio metadata associated with each digital song of the audio library 130 to determine whether any of the metadata matches. To do so, the media correlation module 206 includes a metadata analysis module 240 configured to compare the metadata tags of the video metadata and the metadata tags of the audio metadata to determine whether any of the metadata tags match. The media correlation module 206 may use any suitable mechanism to determine whether a metadata tag of the video metadata matches a metadata tag of the audio metadata. For example, in the illustrative embodiment, the media correlation module 206 is configured to determine whether the characteristics identified by each metadata tag are similar to each other.

The media correlation module 206 also includes a sync point generation module 242 configured to generate a sync point for each pair of matching metadata tags. As such, each sync point is indicative of a similar characteristic between the video and one of the digital songs.

The correlation prioritization module 208 is configured to prioritize the various sync points generated by the sync point generation module 242 based on a correlation policy stored in a correlation policy database 270. To do so, the correlation prioritization module 208 includes a sync point weighting module configured to apply a weighting factor to each sync point based on the correlation policy. The correlation policy defines one or more weighting factors (e.g., numerical numbers) for each particular matching characteristic. For example, an illustrative correlation policy 700 is shown in FIG. 7. The correlation policy 700 includes a column of matching metadata (e.g., the similar characteristic defined by the matching metadata) and a row of associated correlation weighting factors. As shown, different matching characteristics have different weighting factors. For example, if a metadata tag of the audio metadata indicates a lyric that matches an image of the video defined by a corresponding metadata tag of the video metadata, the match (i.e., the corresponding sync point) between the metatag tags/characteristics is illustratively applied a weighting factor of 8 as shown in the first row of the correlation policy 700. Conversely if the lyric identified by the metadata tag of the audio metadata matches a color defined by a metadata tag of the video metadata, the match (i.e., the corresponding sync point) is applied a weighting factor of 4 as shown in the six row of the correlation policy 700. In this way, the correlation prioritization module 208 may prioritize or rank each sync point based on the correlation policy 700.

The media generation module 210 is configured to generate the media compilation using the video and one or more digital songs selected based on the sync points generated by the media correlation module 206. To do so, the media generation module 210 includes a media selection module 260 configured to select one or more digital songs based on the sync points, which identify matching characteristics between the digital songs and the video as discussed above. For example, in the illustrative embodiment, the media generation module 210 is configured to select the one or more digital songs based on the weighting factor applied to each sync song (e.g., the media generation module 210 may select the song or songs having the highest or "best" weighting factor). It should be appreciated that such selection process may occur without direction from the user of the compute device 102.

The media generation module 210 also includes a media rendering module 262 configured to compile the video and the one or more digital songs selected by the media selection module 260. To do so, the media generation module 210 may sync the selected digital song(s) with the video using the determined sync points between the digital song and video. For example, the media generation module 210 may sync the digital song to the video based on the metadata location data associated with each metadata tag defining a sync point between the video and the digital song. In this way, the media generation module 210 may time the song relative to the video for added emphasis or correlation. Additionally, in some embodiments, the media rendering module 262 may be configured to modify the audio to fit the video. For example, the media rendering module 262 may stretch or condensing the digital song (e.g., by speeding up or slowing down portions of the song).

The user interface module 212 is configured to present the media compilation to the user of the compute device 102. For example, the user interface module 212 may display the video portion of the media compilation on the display 140 and play the audio portion of the media compilation on the speaker 142. Additionally, the user interface module 212 may provide an interface through which a user of the compute device 102 may modify or adjust the media compilation. For example, should the user not like the selected digital song(s), the user may modify such selection and cause the compute device 102 to re-render the media compilation with a different digital song.

Figure 3:
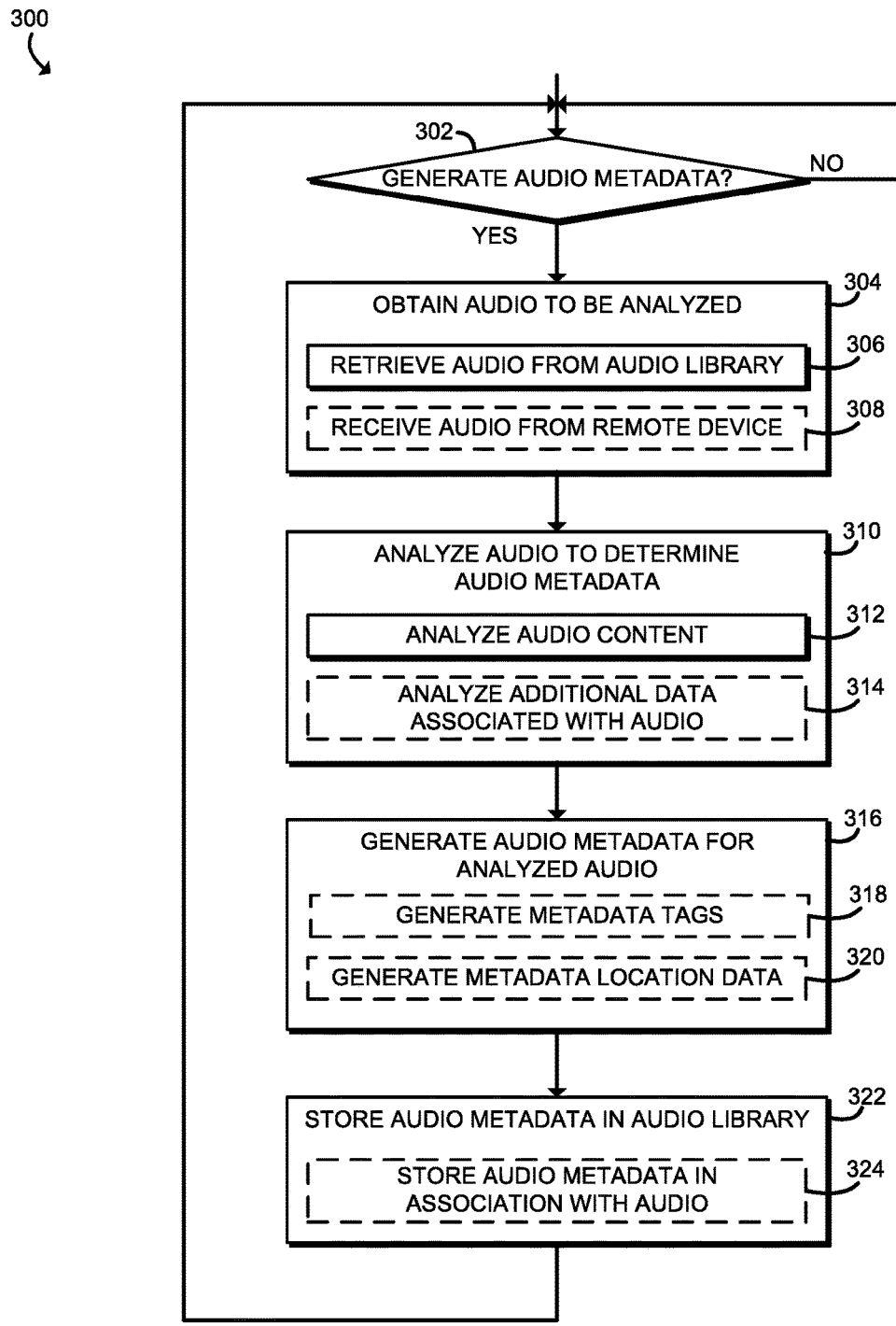
FIG. 3 is a simplified flow diagram of at least one embodiment of a method for analyzing audio to generate audio metadata associated with the audio that may be executed by the compute device of FIGS. 1 and 2.

Referring now to FIG. 3, in use, the compute device 102 may execute a method 300 for analyzing audio to generate audio metadata associated with the audio. As discussed above, the audio is embodied as one or more digital songs in the illustrative embodiment, but may be embodied as other types of audio data in other embodiments. The method 300 begins with block 302 in which the compute device 102 determines whether to generate audio metadata. For example, the compute device 102 may be configured to periodically generate audio metadata for songs stored in the audio library 130 or to generate such audio metadata in response to a user instruction. Regardless, if the compute device 102 determines to generate the audio metadata, the method 300 advances to block 304 in which the compute device 102 obtains the audio to be analyzed. As discussed above, the compute device 102 may retrieve one or more digital songs from the audio library 130 in block 306. Additionally, in some embodiments, the compute device 102 may receive one or more digital songs or other audio from a remote device (e.g., from the mobile compute device 104) in block 308.

After the compute device 102 has obtained the audio to be analyzed, the method 300 advances to block 310 in which the compute node analyzes the digital song or other audio to determine audio metadata. To do so, as discussed above, the compute device 102 may analyze the audio content in block 312 (e.g., the lyrics, tempo, melody, breaks, instruments, etc.). Additionally, in block 314, the compute device 102 may analyze additional data, such as metadata attached to the digital song and/or obtainable from a remote source (e.g., the song gene, the song performer, etc.).

Subsequently, in block 316, the compute device 102 generates the audio metadata based on the analysis of the audio performed in block 310. As discussed above, the audio metadata defines one or more characteristic of the corresponding digital song or other audio data. For example, in block 318, the compute device 102 may generate one or more metadata tags, each of which defines a corresponding characteristic of the digital song or other audio data (e.g., a specific lyric, the song genre, the song temp, etc.). Additionally, in block 320, the compute device may generate metadata location data for one or more of the metadata tags. As discussed above, the metadata location data identifies a location (e.g., a temporal location) in the digital song or other audio data at which the characteristic defined by the associated metadata tag is located.

After the compute device 102 has generated the audio metadata for the analyzed audio, the method 300 advances to block 322 in which the compute device 102 stores the metadata in the audio library 130. For example, as shown in block 324, the compute device 102 may store the metadata in association with the corresponding digital song or other audio data. The method 300 subsequently loops back to block 302 in which the compute device 102 determines whether to generate audio metadata for another digital song or other audio data.

Figure 4:
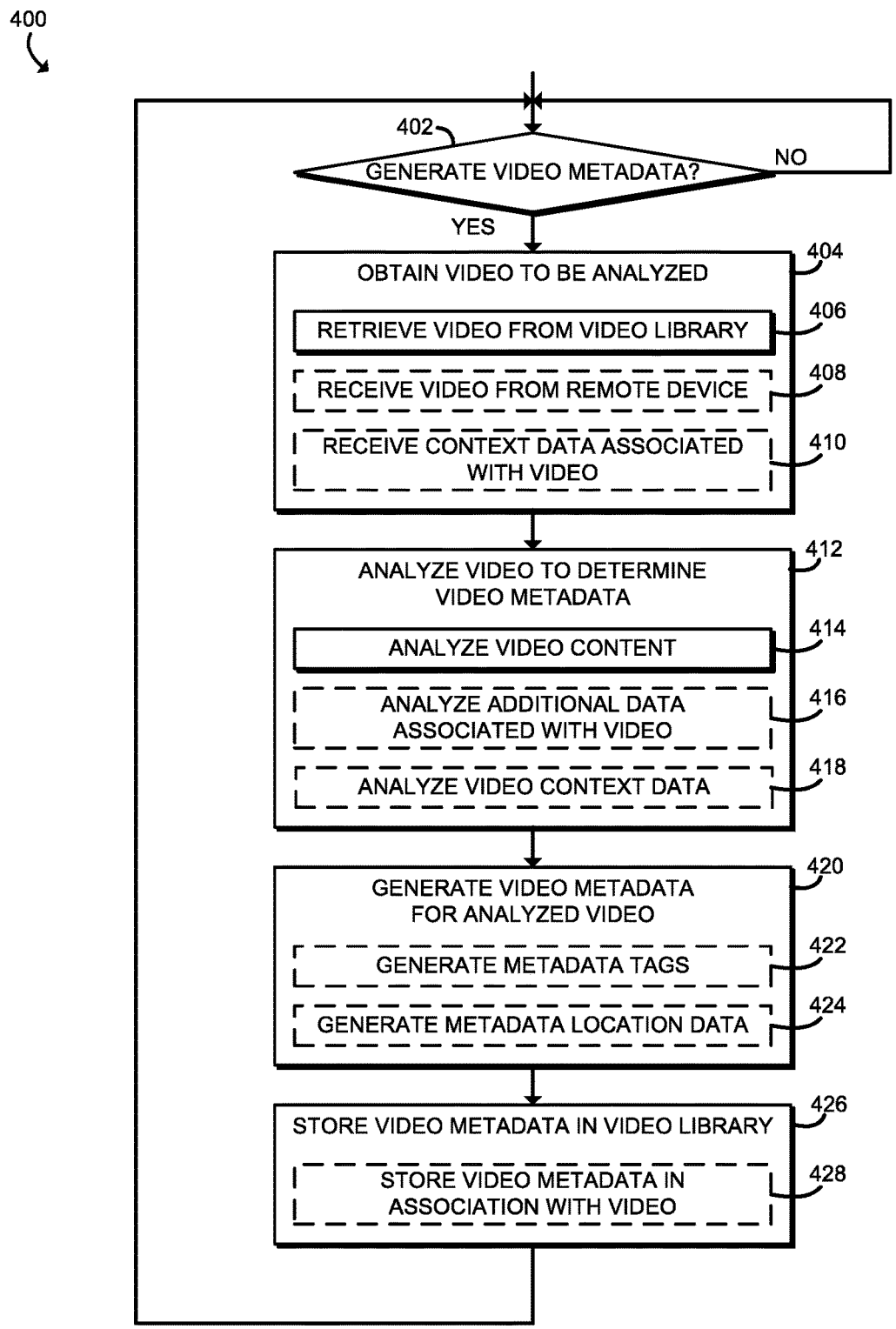
FIG. 4 is a simplified flow diagram of at least one embodiment of a method for analyzing video to generate video metadata associated with the video that may be executed by the compute device of FIGS. 1 and 2.

Referring now to FIG. 4, in use, the compute device 102 may execute a method 400 for analyzing a video to generate video metadata associated with the video. The method 400 begins with block 402 in which the compute device 102 determines whether to generate video metadata. For example, the compute device 102 may be configured to periodically generate video metadata for videos stored in the video library 132 or to generate such video metadata in response to a user instruction. Regardless, if the compute device 102 determines to generate the video metadata, the method 400 advances to block 404 in which the compute device 102 obtains the video to be analyzed. For example, in block 406, the compute device 102 may retrieve the video from the video library 132 (e.g., in response to a selection from the user). Additionally or alternatively, the compute device 102 may receive the video from a remote device in block 408. For example, as discussed above, the compute device 102 may receive a video from the mobile device 104 via the network 106 in block 408. Additionally, in some embodiments, the compute device 102 may receive context data associated with the video in block 410. As discussed above, the context data may be indicative of any context of the video.

After the compute device 102 has obtained the video to be analyzed, the method 400 advances to block 412 in which the compute node analyzes the video to determine video metadata. To do so, as discussed above, the compute device 102 may analyze the video content in block 414 (e.g., images of the video, objects shown in the video, actions performed in the video, colors shown in the video, motion of the video, etc.). Additionally, in block 416, the compute device 102 may analyze additional data, such as metadata attached to the video (e.g., the location at which the video was captured). Further, in block 418, the compute device 102 may analyze any context data associated with the video. For example, as discussed above, the context data may include motion data of a person captured in the video and/or the videographer. As such, the compute device 102 may analyze such motion data to determine the video metadata (e.g., what activity a person captured in the video is performing).

Subsequently, in block 420, the compute device 102 generates the video metadata based on the analysis of the video performed in block 412. As discussed above, the video metadata defines one or more characteristic of the video. For example, in block 422, the compute device 102 may generate one or more metadata tags, each of which defines a corresponding characteristic of the video (e.g., an image shown in the video, a phrase spoken in the video, a color shown in the video, etc.). Additionally, in block 424, the compute device 102 may generate metadata location data for one or more of the metadata tags. As discussed above, the metadata location data identifies a location (e.g., a temporal location) in the video at which the characteristic defined by the associated metadata tag is located.

After the compute device 102 has generated the video metadata for the analyzed video, the method 400 advances to block 422 in which the compute device 102 stores the metadata in the video library 132. For example, as shown in block 428, the compute device 102 may store the metadata in association with the corresponding video. The method 400 subsequently loops back to block 402 in which the compute device 102 determines whether to generate video metadata for another video.

Figure 5:
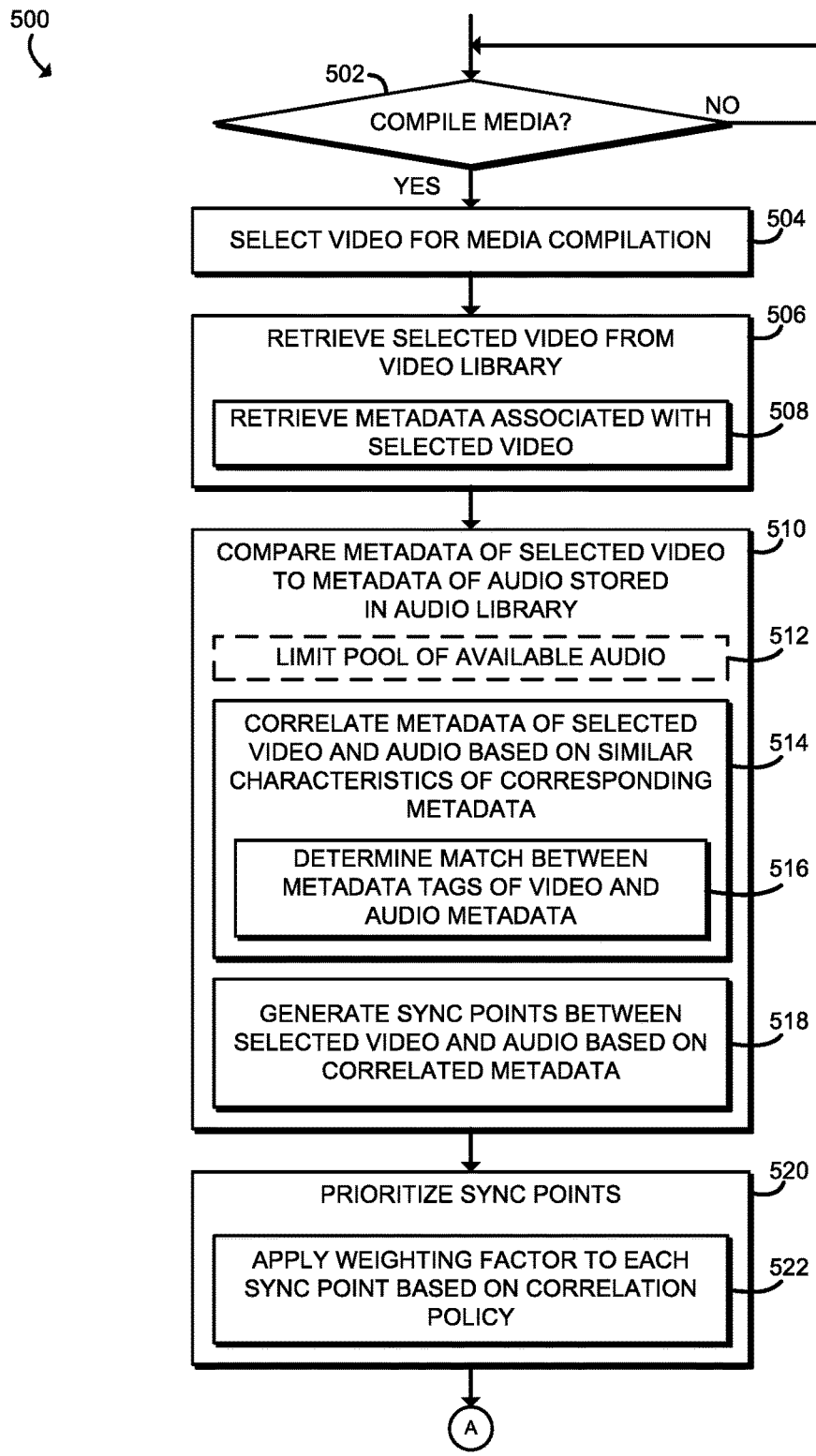
FIGS. 5 and 6 are a simplified flow diagram of at least one embodiment of a method for generating a media compilation that may be executed by the compute device of FIGS. 1 and 2.
Figure 6:
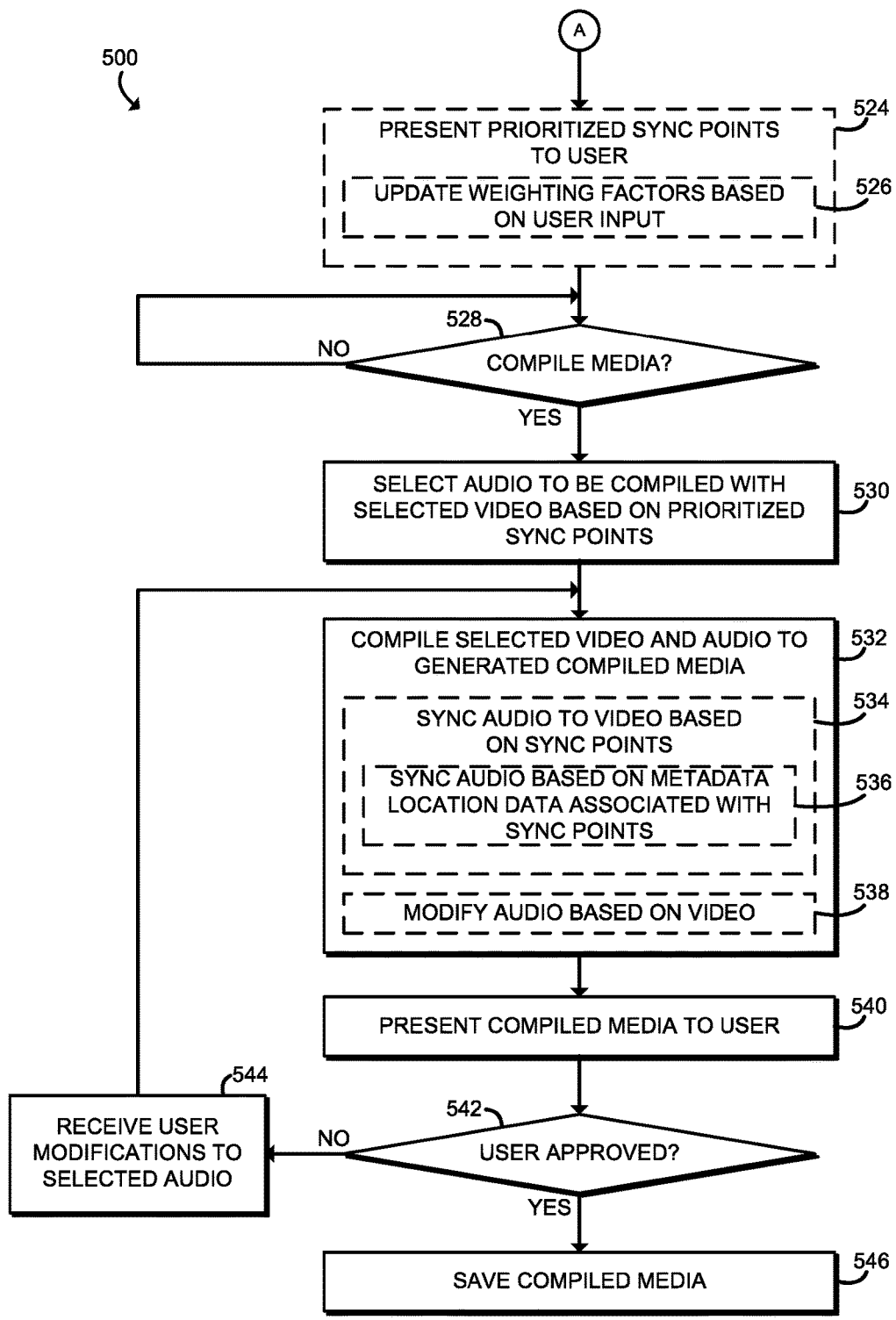

Referring now to FIGS. 5 and 6, in use, the compute device 102 may execute a method 500 for generating a media compilation. The method 500 beings with block 502 in which the compute device 102 determines whether to generate a media compilation. If so, the method 500 advance to block 504 in which the compute node selects the video to be included in the media compilation. For example, in some embodiments, the user of the compute device 102 may instruct the compute device 102 which video to use for the media compilation via the user interface module 212. Subsequently, in block 506, the compute device 102 retrieves the selected video from the video library 132. Additionally, in block 508, the compute device 102 retrieves the video metadata associated with the video form the video library 132. As discussed above, the video metadata includes one or more metadata tags that each defines a different characteristic of the video.

In block 510, the compute device 102 compares the metadata of the selected video with the metadata associated with each digital song (or other audio data) stored in the audio library 130. To do so, the compute device 102 may compare each metadata tag of the video metadata to each metadata tag of the audio metadata of each digital song. In some embodiments, the compute device 102 may reduce the pool size of available digitals songs to analyze in block 512. For example, a user of the compute device 102 may instruct the compute device 102 to ignore some digital songs or only use a subset of digital songs from the audio library 130.

In block 514, the compute device 102 correlates the video metadata of the selected video and the audio metadata of one or more digital songs based on the whether the characteristics defined by the corresponding metadata are similar. For example, in block 516, the compute device 102 may determine whether a metadata tag of the video metadata matches one or more metadata tag of the audio metadata associated with one or more digitals songs. To do so, the compute device 102 may determine whether the characteristics identifies by each pair of metadata tags are similar. As discussed above, the compute device 102 may utilize any suitable methodology to determine whether the pair of metadata tags and/or associated characteristics is similar to each other.

For each matching pair of metadata tags (i.e., a metadata tag of the video metadata and a metadata tag of the audio metadata), the compute device 102 generates a sync point between the video and corresponding digital song or other audio data. As discussed above, each sync point is indicative of a similar characteristic between the video and the corresponding digital song. The compute device 102 may generate any number of sync points based on the number of similar or matching characteristics between the video and the corresponding digital song.

After the sync points have been generated in block 518, the method 500 advances to block 520 in which the compute device 102 prioritizes the generated sync nodes. For example, in block 522, the compute device 102 may apply a weighting factor to each sync point based on the correlation policy (e.g., the correlation policy 700 shown in FIG. 7). As described above, the correlation policy defines one or more weighting factors (e.g., numerical numbers) for each particular matching characteristic. As such, the compute device 102 may be configured to prioritize the sync nodes based on the weighting factors identified in the correlation policy.

After the compute device 102 has prioritized each sync node, the method 500 advances to block 524 of FIG. 6. In block 524, in some embodiments, the compute device 102 may present the generated sync node and associated weighting factors to the user a sync table. For example, an illustrative sync table 800 is shown in FIG. 8. The sync table 800 includes a first column 802 identify video metadata of the video, a second column 804 identify audio metadata of a digital song that matches the video metadata of the same row, and a third column 806 that identified the weighting factor applied to each matched metadata (i.e., matched characteristics). As discussed above, the weighting factors applied to each matched metadata is based on the correlation policy. Referring back to FIG. 6, in block 526, the user of the compute device 102 may update the one or more of the applied weighting factors to increase or decrease the priority of a corresponding matched metadata.

In block 528, the compute device 102 determines whether to generate a media compilation based on the selected video and the generated prioritized sync points. If so, the method 500 advances to block 530 in which the compute device 102 selects one or more digital songs or other audio to be included in the media compilation based on the prioritized sync points. For example, the compute device 102 may select those sync points having the highest or "best" corresponding weighting factors.

After the one or more digital songs or other audio data has been selected in block 530, the method 500 advances to block 532 in which the compute device 102 compiles the selected video and audio to generate the media completion. To do so, in block 534, the compute device 102 may sync the selected digital song(s) with the video based on the sync points defined between the video and corresponding digital song. For example, in block 536, the compute device 102 may sync the digital song(s) to the video based on the metadata location data associated with each metadata tag defining a sync point between the video and the digital song (e.g., to temporally match characteristics of the video and digital song). Additionally, in some embodiments, the compute device 102 may modify the audio to better fit or otherwise sync with the video. For example, the compute device 102 may stretch or condense the digital song (e.g., by speeding up or slowing down portions of the song).

After the compute device 102 has generated the media compilation in block 532, the method 500 advances to block 540 in which the compute device 102 presents the compiled media to the user of the compute node. For example, the compute device 102 may display the video portion of the media compilation on the display 140 and play the audio portion of the media compilation on the speaker 142.

In block 542, the compute device 102 determines whether the user approves the generated media compilation. For example, the user may supply a user input or instruction via the user interface module 212 indicative of whether the media compilation is acceptable to the user. If not, the method 500 advances to block 544 in which the compute device 102 may receive user modifications to the selected audio. For example, the user may remove a song from the media compilation, request that another song be added, change the relative temporal position of the song, and/or provide additional modifications to one or more digital songs of the generated media compilation. After the compute device 102 receives the user modifications, the method 300 loops back to block 532 in which the compute node re-compiles the selected video and updated digital song(s) to generate a new media compilation, which is subsequently presented to the user in block 540. If, however, the user approves the media compilation in block 542, the method 500 advances to block 546 in which the compute device saves the compiled media (e.g., in the data storage 120).

As described above, the compute device 102 is configured to generate a media compilation using a selected video and a library of digital songs or other audio data.

Additionally, in some embodiments, the compute device 102 may generate the media compilation with little or no direction from the user.

EXAMPLES

Illustrative examples of the technologies disclosed herein are provided below. An embodiment of the technologies may include any one or more, and any combination of, the examples described below.

Example 1 includes a compute device to generate a media compilation, the compute device comprising a media correlation module to (i) compare video metadata associated with a video and audio metadata associated with a plurality of digital songs to determine one or more matches between the video metadata and the audio metadata and (ii) generate a sync point for each determined match between the video metadata and the audio metadata, wherein each sync point is indicative a characteristic of the video that is similar to a corresponding characteristic of a digital song of the plurality of digital songs; and a media generation module to (i) select one or more digital songs of the plurality of digital songs to be compiled with the video based on the one or more sync points and (ii) compile the video and the selected one or more digital songs to generate a media compilation.

Example 2 includes the subject matter of Example 1, and wherein to compare the video metadata associated with the video and audio metadata associated with the plurality of digital songs comprises to compare one or more metadata tags of the video metadata to one or more metadata tags of the audio metadata, wherein each metadata tag of the video metadata is indicative of a characteristic of the video and each metadata tag of the audio metadata is indicative of a characteristic of a corresponding digital song of the plurality of digital songs.

Example 3 includes the subject matter of any of Examples 1 and 2, and wherein each metadata tag of the video metadata includes metadata location data that identifies a location in the video at which the corresponding metadata tag occurs and each metadata tag of the audio metadata includes metadata location data that identifies a location in a corresponding digital song at which the corresponding metadata tag occurs.

Example 4 includes the subject matter of any of Examples 1-3, and wherein to compile the video and the selected one or more digital songs comprises to sync at least one digital song of the selected one or more digital songs with the video based on the metadata location data of at least one metadata tag of the video and the metadata location data of a corresponding metadata tag of the at least one digital song.

Example 5 includes the subject matter of any of Examples 1-4, and wherein to compare the video metadata and the audio metadata comprises to define, in response to a user input, a set of digital songs less than the plurality of digital songs; and compare the video metadata associated with a video and the audio metadata associated with the set of digital songs to determine one or more matches between the video metadata and the audio metadata.

Example 6 includes the subject matter of any of Examples 1-5, and further including a correlation prioritization module to prioritize each sync point based on the characteristic of the video and the digital song associated with the corresponding sync point.

Example 7 includes the subject matter of any of Examples 1-6, and wherein to prioritize each sync point comprises to apply a weighting factor to each sync point based on (i) the characteristic of the video and the digital song associated with the corresponding sync point and (ii) a correlation policy, wherein the correlation policy defines a weighting factor for a plurality of matching characteristics.

Example 8 includes the subject matter of any of Examples 1-7, and wherein to select the one or more digital songs comprises to select the one or more digital songs based the weighting factor applied to each sync point.

Example 9 includes the subject matter of any of Examples 1-8, and further including the correlation prioritization module is further to update at least one weighting factor of at least one sync point in response to an input from a user of the compute device; and re-prioritize each sync point based on the updated at least one weighting factor.

Example 10 includes the subject matter of any of Examples 1-9, and wherein to compile the video and the selected one or more digital songs comprises to compile the video and one digital song.

Example 11 includes the subject matter of any of Examples 1-10, and wherein to compile the video and the selected one or more digital songs comprises to sync at least one digital song of the selected one or more digital songs with the video based on at least one sync point between video and the at least one digital song.

Example 12 includes the subject matter of any of Examples 1-11, and wherein to sync the at least one digital song with the video based on the at least one sync point comprises to modify the digital song.

Example 13 includes the subject matter of any of Examples 1-12, and wherein to modify the digital song comprises to stretch or condense the digital song.

Example 14 includes the subject matter of any of Examples 1-13, and further including an audio analysis module to analyze each digital song of the plurality of digital songs to determine one or more characteristics of each digital song; and generate audio metadata for the each digital song based on the determined one or more characteristics of the corresponding digital song.

Example 15 includes the subject matter of any of Examples 1-14, and wherein to generate the audio metadata comprises to generate one or more metadata tags for each digital song, wherein each metadata tag is indicative of a different characteristic of the corresponding digital song.

Example 16 includes the subject matter of any of Examples 1-15, and further including a video analysis module to analyze the video to determine one or more characteristics of the video; and generate video metadata for the video based on the determined one or more characteristics.

Example 17 includes the subject matter of any of Examples 1-16, and wherein to generate the video metadata comprises to generate one or more metadata tags for the video, wherein each metadata tag is indicative of a different characteristic of the video.

Example 18 includes the subject matter of any of Examples 1-17, and wherein to analyze the video comprises to analyze video context data associated with video, wherein the video context data comprises sensor data generated by a sensor carried by a person viewable in the video.

Example 19 includes the subject matter of any of Examples 1-18, and wherein at least one sync point is indicative of a matching characteristic between the video and the digital song, and wherein the matching characteristic includes at least one of (i) matching words identified based on an automatic speech recognition analysis of the video and the digital song, (ii) a speed of movement represented in the video and a volume or beat of the digital song, and (iii) an object recognized in the video and a name of the object recognized in the digital song.

Example 20 includes a method for generating a media compilation, the method comprising comparing, by a compute device, video metadata associated with a video and audio metadata associated with a plurality of digital songs to determine one or more matches between the video metadata and the audio metadata; generating, by the compute device, a sync point for each determined match between the video metadata and the audio metadata, wherein each sync point is indicative a characteristic of the video that is similar to a corresponding characteristic of a digital song of the plurality of digital songs; selecting, by the compute device, one or more digital songs of the plurality of digital songs to be compiled with the video based on the one or more sync points; and compiling, by the compute device, the video and the selected one or more digital songs to generate a media compilation.

Example 21 includes the subject matter of Example 20, and wherein comparing the video metadata associated with the video and audio metadata associated with the plurality of digital songs comprises comparing one or more metadata tags of the video metadata to one or more metadata tags of the audio metadata, wherein each metadata tag of the video metadata is indicative of a characteristic of the video and each metadata tag of the audio metadata is indicative of a characteristic of a corresponding digital song of the plurality of digital songs.

Example 22 includes the subject matter of any of Examples 20 and 21, and wherein each metadata tag of the video metadata includes metadata location data that identifies a location in the video at which the corresponding metadata tag occurs and each metadata tag of the audio metadata includes metadata location data that identifies a location in a corresponding digital song at which the corresponding metadata tag occurs.

Example 23 includes the subject matter of any of Examples 20-22, and wherein compiling the video and the selected one or more digital songs comprises syncing at least one digital song of the selected one or more digital songs with the video based on the metadata location data of at least one metadata tag of the video and the metadata location data of a corresponding metadata tag of the at least one digital song.

Example 24 includes the subject matter of any of Examples 20-23, and wherein comparing the video metadata and the audio metadata comprises defining, in response to a user input, a set of digital songs less than the plurality of digital songs; and comparing the video metadata associated with a video and the audio metadata associated with the set of digital songs to determine one or more matches between the video metadata and the audio metadata.

Example 25 includes the subject matter of any of Examples 20-24, and further including prioritizing each sync point based on the characteristic of the video and the digital song associated with the corresponding sync point.

Example 26 includes the subject matter of any of Examples 20-25, and wherein prioritizing each sync point comprises applying a weighting factor to each sync point based on (i) the characteristic of the video and the digital song associated with the corresponding sync point and (ii) a correlation policy, wherein the correlation policy defines a weighting factor for a plurality of matching characteristics.

Example 27 includes the subject matter of any of Examples 20-26, and wherein selecting the one or more digital songs comprises selecting the one or more digital songs based the weighting factor applied to each sync point.

Example 28 includes the subject matter of any of Examples 20-27, and further including updating at least one weighting factor of at least one sync point in response to an input from a user of the compute device; and re-prioritizing each sync point based on the updated at least one weighting factor.

Example 29 includes the subject matter of any of Examples 20-28, and wherein compiling the video and the selected one or more digital songs comprises compiling the video and one digital song.

Example 30 includes the subject matter of any of Examples 20-29, and wherein compiling the video and the selected one or more digital songs comprises syncing at least one digital song of the selected one or more digital songs with the video based on at least one sync point between video and the at least one digital song.

Example 31 includes the subject matter of any of Examples 20-30, and wherein syncing the at least one digital song with the video based on the at least one sync point comprises modifying the digital song.

Example 32 includes the subject matter of any of Examples 20-31, and wherein modifying the digital song comprises stretching or condensing the digital song.

Example 33 includes the subject matter of any of Examples 20-32, and further including analyzing, by the compute device, each digital song of the plurality of digital songs to determine one or more characteristics of each digital song; and generating, by the compute device, audio metadata for the each digital song based on the determined one or more characteristics of the corresponding digital song.

Example 34 includes the subject matter of any of Examples 20-33, and wherein generating the audio metadata comprises generating one or more metadata tags for each digital song, wherein each metadata tag is indicative of a different characteristic of the corresponding digital song.

Example 35 includes the subject matter of any of Examples 20-34, and further including analyzing, by the compute device, the video to determine one or more characteristics of the video; and generating, by the compute device, video metadata for the video based on the determined one or more characteristics.

Example 36 includes the subject matter of any of Examples 20-35, and wherein generating the video metadata comprises generating one or more metadata tags for the video, wherein each metadata tag is indicative of a different characteristic of the video.

Example 37 includes the subject matter of any of Examples 20-36, and wherein analyzing the video comprises analyzing video context data associated with video, wherein the video context data comprises sensor data generated by a sensor carried by a person viewable in the video.

Example 38 includes the subject matter of any of Examples 20-37, and wherein at least one sync point is indicative of a matching characteristic between the video and the digital song, and wherein the matching characteristic includes at least one of (i) matching words identified based on an automatic speech recognition analysis of the video and the digital song, (ii) a speed of movement represented in the video and a volume or beat of the digital song, and (iii) an object recognized in the video and a name of the object recognized in the digital song.

Example 39 includes one or more machine-readable storage media comprising a plurality of instructions stored thereon that, when executed, cause a compute device to perform the method of any of Examples 20-38.

Example 40 includes a compute device to generate a media compilation, the compute device comprising means for comparing video metadata associated with a video and audio metadata associated with a plurality of digital songs to determine one or more matches between the video metadata and the audio metadata; means for generating a sync point for each determined match between the video metadata and the audio metadata, wherein each sync point is indicative a characteristic of the video that is similar to a corresponding characteristic of a digital song of the plurality of digital songs; means for selecting one or more digital songs of the plurality of digital songs to be compiled with the video based on the one or more sync points; and means for compiling the video and the selected one or more digital songs to generate a media compilation.

Example 41 includes the subject matter of Example 40, and wherein the means for comparing the video metadata associated with the video and audio metadata associated with the plurality of digital songs comprises means for comparing one or more metadata tags of the video metadata to one or more metadata tags of the audio metadata, wherein each metadata tag of the video metadata is indicative of a characteristic of the video and each metadata tag of the audio metadata is indicative of a characteristic of a corresponding digital song of the plurality of digital songs.

Example 42 includes the subject matter of any of Examples 40 and 41, and wherein each metadata tag of the video metadata includes metadata location data that identifies a location in the video at which the corresponding metadata tag occurs and each metadata tag of the audio metadata includes metadata location data that identifies a location in a corresponding digital song at which the corresponding metadata tag occurs.

Example 43 includes the subject matter of any of Examples 40-42, and wherein the means for compiling the video and the selected one or more digital songs comprises means for syncing at least one digital song of the selected one or more digital songs with the video based on the metadata location data of at least one metadata tag of the video and the metadata location data of a corresponding metadata tag of the at least one digital song.

Example 44 includes the subject matter of any of Examples 40-43, and wherein the means for comparing the video metadata and the audio metadata comprises means for defining, in response to a user input, a set of digital songs less than the plurality of digital songs; and means for comparing the video metadata associated with a video and the audio metadata associated with the set of digital songs to determine one or more matches between the video metadata and the audio metadata.

Example 45 includes the subject matter of any of Examples 40-44, and further including means for prioritizing each sync point based on the characteristic of the video and the digital song associated with the corresponding sync point.

Example 46 includes the subject matter of any of Examples 40-45, and wherein the means for prioritizing each sync point comprises means for applying a weighting factor to each sync point based on (i) the characteristic of the video and the digital song associated with the corresponding sync point and (ii) a correlation policy, wherein the correlation policy defines a weighting factor for a plurality of matching characteristics.

Example 47 includes the subject matter of any of Examples 40-46, and wherein the means for selecting the one or more digital songs comprises means for selecting the one or more digital songs based the weighting factor applied to each sync point.

Example 48 includes the subject matter of any of Examples 40-47, and further including means for updating at least one weighting factor of at least one sync point in response to an input from a user of the compute device; and means for re-prioritizing each sync point based on the updated at least one weighting factor.

Example 49 includes the subject matter of any of Examples 40-48, and wherein the means for compiling the video and the selected one or more digital songs comprises means for compiling the video and one digital song.

Example 50 includes the subject matter of any of Examples 40-49, and wherein the means for compiling the video and the selected one or more digital songs comprises means for syncing at least one digital song of the selected one or more digital songs with the video based on at least one sync point between video and the at least one digital song.

Example 51 includes the subject matter of any of Examples 40-50, and wherein the means for syncing the at least one digital song with the video based on the at least one sync point comprises means for modifying the digital song.

Example 52 includes the subject matter of any of Examples 40-51, and wherein the means for modifying the digital song comprises stretching or condensing the digital song.

Example 53 includes the subject matter of any of Examples 40-52, and further including means for analyzing each digital song of the plurality of digital songs to determine one or more characteristics of each digital song; and means for generating audio metadata for the each digital song based on the determined one or more characteristics of the corresponding digital song.

Example 54 includes the subject matter of any of Examples 40-53, and wherein means for generating the audio metadata comprises means for generating one or more metadata tags for each digital song, wherein each metadata tag is indicative of a different characteristic of the corresponding digital song.

Example 55 includes the subject matter of any of Examples 40-54, and further including means for analyzing the video to determine one or more characteristics of the video; and means for generating video metadata for the video based on the determined one or more characteristics.

Example 56 includes the subject matter of any of Examples 40-55, and wherein the means for generating the video metadata comprises means for generating one or more metadata tags for the video, wherein each metadata tag is indicative of a different characteristic of the video.

Example 57 includes the subject matter of any of Examples 40-56, and wherein the means for analyzing the video comprises analyzing video context data associated with video, wherein the video context data comprises sensor data generated by a sensor carried by a person viewable in the video.

Example 58 includes the subject matter of any of Examples 40-57, and wherein at least one sync point is indicative of a matching characteristic between the video and the digital song, and wherein the matching characteristic includes at least one of (i) matching words identified based on an automatic speech recognition analysis of the video and the digital song, (ii) a speed of movement represented in the video and a volume or beat of the digital song, and (iii) an object recognized in the video and a name of the object recognized in the digital song.

The invention claimed is:

1. A compute device comprising:
a media correlation module to (i) compare one or more metadata tags of video metadata associated with a video and one or more metadata tags of audio metadata associated with a plurality of digital songs to determine one or more matches between the video metadata and the audio metadata, wherein each metadata tag of the video metadata includes metadata location data that identifies a location in the video at which the corresponding metadata tag occurs and each metadata tag of the audio metadata includes metadata location data that identifies a location in a corresponding digital song at which the corresponding metadata tag occurs and (ii) generate a sync point for each determined match between the one or more metadata tags of the video metadata and the one or more metadata tags of the audio metadata, wherein each sync point is indicative a characteristic of the video that is similar to a corresponding characteristic of a digital song of the plurality of digital songs; and
a media generation module to (i) select a digital song of the plurality of digital songs to be compiled with the video based on a first sync point between the selected digital song and the video, (ii) identify a first location in the video of the metadata tag of the video metadata that corresponds to the first sync point and a second location in the selected digital song of the metadata tag of the audio metadata that corresponds to the first sync point; and (iii) compile the video and the selected digital song to generate a media compilation, wherein to compile the video and the selected digital song comprises to sync the first location in the video with the second location in the selected digital song.

2. The compute device of claim 1, wherein each metadata tag of the video metadata is indicative of a characteristic of the video and each metadata tag of the audio metadata is indicative of a characteristic of a corresponding digital song of the plurality of digital songs.

3. The compute device of claim 1, further comprising a correlation prioritization module to prioritize each sync point based on the characteristic of the video and the digital song associated with the corresponding sync point.

4. The compute device of claim 3, wherein to prioritize each sync point comprises to apply a weighting factor to each sync point based on (i) the characteristic of the video and the digital song associated with the corresponding sync point and (ii) a correlation policy, wherein the correlation policy defines a weighting factor for a plurality of matching characteristics.

5. The compute device of claim 4, wherein to select the digital song comprises to select the digital song based on the weighting factor applied to each sync point.

6. The compute device of claim 4, further the correlation prioritization module is further to:
    update at least one weighting factor of at least one sync point in response to an input from a user of the compute device; and
    re-prioritize each sync point based on the updated at least one weighting factor.

7. The compute device of claim 1, wherein to compile the video and the selected digital song comprises to sync at least one digital song of the plurality of digital songs with the video based on at least one sync point between video and the at least one digital song.

8. One or more machine-readable storage media comprising a plurality of instructions stored thereon that, when executed, cause a compute device to:
    compare one or more metadata tags of video metadata associated with a video and one or more metadata tags of audio metadata associated with a plurality of digital songs to determine one or more matches between the video metadata and the audio metadata, wherein each metadata tag of the video metadata includes metadata location data that identifies a location in the video at which the corresponding metadata tag occurs and each metadata tag of the audio metadata includes metadata location data that identifies a location in a corresponding digital song at which the corresponding metadata tag occurs;
    generate a sync point for each determined match between the one or more metadata tags of the video metadata and the one or more metadata tags of the audio metadata, wherein each sync point is indicative a characteristic of the video that is similar to a corresponding characteristic of a digital song of the plurality of digital songs;
    select a digital song of the plurality of digital songs to be compiled with the video based on a first sync point between the selected digital song and the video;
    identify a first location in the video of the metadata tag of the video metadata that corresponds to the first sync point and a second location in the selected digital song of the metadata tag of the audio metadata that corresponds to the first sync point; and
    compile the video and the selected digital song to generate a media compilation, wherein to compile the video and the selected digital song comprises to sync the first location in the video with the second location in the selected digital song.

9. The one or more machine-readable storage media of claim 8, wherein each metadata tag of the video metadata is indicative of a characteristic of the video and each metadata tag of the audio metadata is indicative of a characteristic of a corresponding digital song of the plurality of digital songs.

10. The one or more machine-readable storage media of claim 8, further comprising to prioritize each sync point based on the characteristic of the video and the digital song associated with the corresponding sync point.

11. The one or more machine-readable storage media of claim 10, wherein to prioritize each sync point comprises apply a weighting factor to each sync point based on (i) the characteristic of the video and the digital song associated with the corresponding sync point and (ii) a correlation policy, wherein the correlation policy defines a weighting factor for a plurality of matching characteristics.

12. The one or more machine-readable storage media of claim 11, wherein to select the digital song comprises to select the digital song based the weighting factor applied to each sync point.

13. The one or more machine-readable storage media of claim 8, wherein to compile the video and the selected digital song comprises to sync at least one digital song of the plurality of digital songs with the video based on at least one sync point between video and the at least one digital song.

14. A method comprising:
    comparing, by a compute device, one or more metadata tags of video metadata associated with a video and one or more metadata tags of audio metadata associated with a plurality of digital songs to determine one or more matches between the video metadata and the audio metadata, wherein each metadata tag of the video metadata includes metadata location data that identifies a location in the video at which the corresponding metadata tag occurs and each metadata tag of the audio metadata includes metadata location data that identifies a location in a corresponding digital song at which the corresponding metadata tag occurs;
    generating, by the compute device, a sync point for each determined match between the one or more metadata tags of the video metadata and the one or more metadata tags of the audio metadata, wherein each sync point is indicative a characteristic of the video that is similar to a corresponding characteristic of a digital song of the plurality of digital songs;
    selecting, by the compute device, a digital song of the plurality of digital songs to be compiled with the video based on a first sync point between the selected digital song and the video;
    identifying, by the compute device, a first location in the video of the metadata tag of the video metadata that corresponds to the first sync point and a second location in the selected digital song of the metadata tag of the audio metadata that corresponds to the first sync point; and
    compiling, by the compute device, the video and the selected digital song to generate a media compilation, wherein compiling the video and the selected digital song comprises syncing the first location in the video with the second location in the selected digital song.

15. The method of claim 14, wherein each metadata tag of the video metadata is indicative of a characteristic of the video and each metadata tag of the audio metadata is indicative of a characteristic of a corresponding digital song of the plurality of digital songs.

16. The method of claim 14, further comprising prioritizing each sync point based on the characteristic of the video and the digital song associated with the corresponding sync point.

17. The method of claim 16, wherein prioritizing each sync point comprises applying a weighting factor to each sync point based on (i) the characteristic of the video and the digital song associated with the corresponding sync point and (ii) a correlation policy, wherein the correlation policy defines a weighting factor for a plurality of matching characteristics.

18. The method of claim 17, wherein selecting the digital song comprises selecting the digital song based the weighting factor applied to each sync point.

19. The method of claim 14, wherein compiling the video and the selected digital song comprises syncing at least one digital song of the plurality of digital songs with the video based on at least one sync point between video and the at least one digital song.

* * * * *